Feb. 19, 1935.     J. M. RURKA     1,992,042
VACUUM CLEANING MACHINE
Filed April 29, 1933
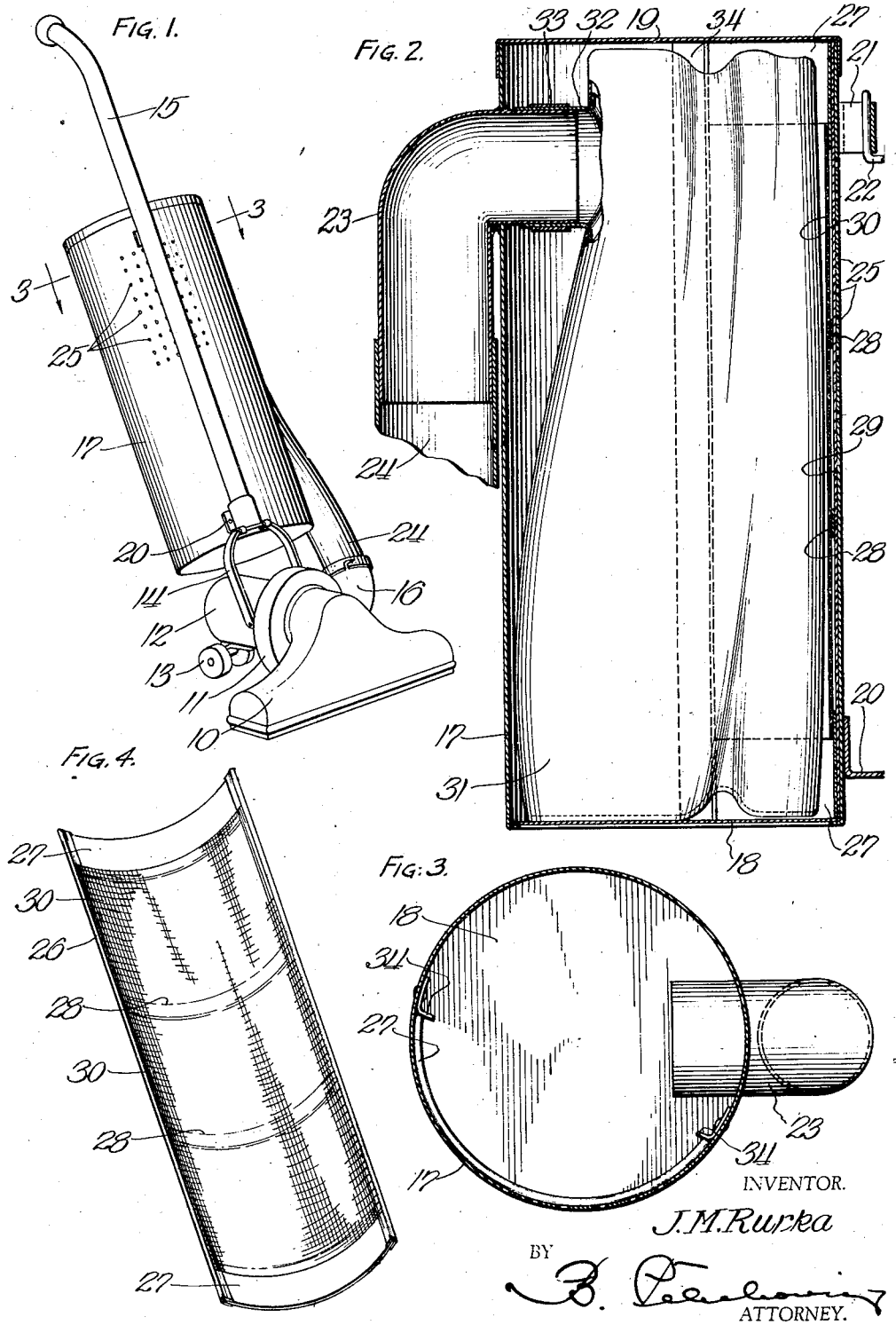
INVENTOR.
J.M.Rurka
BY
ATTORNEY.

Patented Feb. 19, 1935

1,992,042

UNITED STATES PATENT OFFICE 1,992,042

VACUUM CLEANING MACHINE

Joseph M. Rurka, Chicago, Ill.

Application April 29, 1933, Serial No. 668,501

3 Claims. (Cl. 183—51)

The present invention relates to vacuum cleaning machines and has for its object the provision of a replaceable filtering bag wherein the dirt may be deposited as the same is blown thereto by the suction pump, which bag may remain within a receptacle suspended upon a conventional handle.

A further object of the present invention is the provision of a receptacle which may receive a dirt collecting filtering bag and into which the dirt may be thrown off by suction from the pump through the upper end of the bag instead of from the lower end thereof as is usual in the conventional vacuum cleaning machines.

A further object of the present invention is the provision of filtering means within a receptacle of the character above indicated from which the air may filter into the atmosphere and in which the particles of dust passing from the filtering bag may remain.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views, Fig. 1 is a perspective elevational view of the vacuum cleaning machine;

Fig. 2 is a vertical sectional view through the receptacle with the filtering bag remaining therewithin;

Fig. 3 is a top plan view of the receptacle with the cover removed; and

Fig. 4 is an elevational perspective view of a filtering shield cooperating with the receptacle.

Referring in detail to the present drawing, and particularly to Fig. 1 thereof, there is shown a vacuum cleaning machine which includes the brush casing 10, suction pump casing 11 and motor casing 12. The usual wheels 13 positioned below the motor casing 12 facilitate the traction of the machine upon the floor. A U-shaped bracket 14 pivotally mounted upon the motor casing 12 carries a usual handle 15 by means of which the machine is pushed upon the floor.

The device further includes an outlet stub pipe 16 communicating with the pump casing 11 and through which the dust and dirt is thrown off into the collecting bag hereinafter described. This is the usual construction of a vacuum cleaning machine.

My device, adapted to cooperate with a vacuum cleaning machine, includes a cylindrical receptacle 17 having bottom 18 and a cover 19. Mounted upon said receptacle 17 and adjacent its lower end is a pair of L-shaped plates 20 which are adapted to engage the upper end of bracket 14, whereby the lower end of receptacle 17 is supported upon handle 15, handle 15 passing between the said pair of plates 20, as seen on Fig. 1.

The upper end of said receptacle 17 has a U-shaped bracket 21 mounted thereupon which is adapted to engage hook 22 affixed to handle 15.

Communicating with said receptacle 17 is a substantially L-shaped pipe 23, one section of which enters within said receptacle, while the other section depends downwardly and is in parallel relation with said receptacle 17, as clearly seen on Fig. 2. Said lower end of pipe 23 is adapted to receive thereupon one end of flexible pipe 24, while the other end of said flexible pipe 24 connects with the stub pipe 16.

A portion of the periphery of said receptacle 17 is perforated by a series of apertures as at 25, and said perforated portion of receptacle 17 cooperates with the shield illustrated in Fig. 4 for permitting the filtration of air from said receptacle 17 into the atmosphere.

Said filtering shield illustrated in Fig. 4 includes edge plates 26 which are U-shaped in cross-section and which are adapted to clamp curved end plates 27 and a plurality of intermediate plates or strips 28. Also clamped within the edge plates 26 and spread over said intermediate strips 28 is fabric 29 which remains outwardly of the shield and is adapted to contact with the inner periphery of receptacle 17. Lining the inner face of the shield is a net 30 which is likewise resting upon plates 27 and strips 28 and is likewise attached to edge plates 26 in any suitable manner. Receivable within said receptacle 17 is a fabric bag 31 which may be made of flannel or other suitable material, which is comparatively impervious to the passage of dust, but which permits the filtration of air therethrough. Laterally projecting and adjacent the upper end thereof bag 31 has a mouth 32 which is adapted to fit over the inner portion of pipe 23. A metallic ring or sleeve 33 slidable upon the periphery of said inner portion of said pipe 23 is adapted to hold mouth 32 in position over said pipe 23.

A pair of spaced guiding rails 34 longitudinally arranged within receptacle 17 hold the shield hereinabove described and illustrated in Fig. 4 in position and permit the withdrawal thereof from the receptacle on removing cover 19 therefrom.

From the hereinabove description it will be seen that the swept dirt and dust first passes through the pump casing 11 and is thrown therefrom into stub pipe 16 and flexible pipe 24, and through L-shaped pipe 23 is led into the collecting filtering bag 31, where the same will drop to the bottom of said bag 31. The air likewise will find its way simultaneously with the dirt and dust into bag 31 and through there it is permitted to filter through the fabric of the bag into receptacle 17. From said receptacle 17 the air is forced to pass through the shield illustrated in Fig. 4 and then to escape into the atmosphere through perforations 25. Obviously, minute particles of dust which may pass through bag 31 will remain in receptacle 17, the shield preventing their passage through perforations 25.

Since it is contemplated that inexpensive bags are to be used in connection with the present invention, bag 31 on being filled with dust and dirt may be removed bodily from receptacle 17 on disconnecting mouth 32 from pipe 33, and may be destroyed together with its contents. Likewise the receptacle 17 may periodically be cleaned from any minute particles of dust which may collect therein and which may find their way through the bag.

From the hereinabove description it will be seen that some of the advantages of the present device over the conventional vacuum cleaning machines reside in the fact that in accordance with the present device replaceable dust collecting bags may be employed which may be destroyed upon single operation of the vacuum cleaning machine.

Furthermore, the present device contemplates passing of dust and dirt from the upper end of the bag, and the dust and dirt finding its way into the bag immediately falls to the bottom of the bag due to gravitation, unlike in the present machines in which the dust and dirt is led into the bag from the lower end thereof from where a considerable amount of it returns back into the pump casing on stopping the motor.

It is observed that the advantage of net 30 resides in the fact that when the shield is in its operative position as illustrated in Fig. 2 the same remains interposed between fabric 29 and the body of filtering bag 31, by virtue of which fact there is no immediate contact between the body of the bag and said fabric 29 and no consequent clogging of said lining by bag 31. In other words, no matter what degree of expansion there is of bag 31 under the inward pressure of air as the same is driven thereto and as the same endeavors to filter through bag 31, the filtered air has at all times an unimpeded chance to again filter through the shield, or more specifically through fabric 29 and pass through perforations 25 to the atmosphere. Thus the purpose of net 30 is to provide a spacing medium between fabric 29 and bag 31 under all conditions of the latter.

While there is described herein a preferred embodiment of the present invention, it is nevertheless to be understood that minor changes may be made therein, without departing from the spirit and scope of the invention as claimed.

What I claim as new is:

1. In combination with a vacuum cleaning machine including a pump casing, a dirt and dust collecting device comprising a receptacle, a portion of the wall of said receptacle being perforated, a pipe connecting with said pump casing, the other end of said pipe connecting with said receptacle and entering therewithin, a replaceable filtering bag connecting with the portion of said pipe within said receptacle, and a filtering shield within said receptacle superimposed upon said perforated portion of the body of said receptacle.

2. In combination with a vacuum cleaning machine including a pump casing, a dirt and dust collecting device comprising a receptacle, a pipe connecting with said pump casing by one of its ends, the other end of said pipe connecting with the upper end of and entering said receptacle, a filtering bag within said receptacle connecting by its upper end with a portion of said pipe within said receptacle, a portion of the body of said receptacle being perforated, and a filtering shield inwardly of said receptacle and superimposed upon said perforated portion thereof.

3. In combination with a vacuum cleaning machine including a pump casing and a handle, a dirt and dust collecting device comprising a receptacle, means for attaching said receptacle to said handle, a pipe connecting by one of its ends with said pump casing, the other end of said pipe connecting with and entering into the receptacle adjacent its upper end, a filtering bag within said receptacle connecting with said last mentioned end of said pipe, a portion of the wall of said receptacle being perforated, and a removable filtering shield inwardly superimposed upon said perforated portion of the wall of the receptacle.

JOSEPH M. RURKA.